United States Patent
Khomutovskiy et al.

(10) Patent No.: US 10,247,258 B2
(45) Date of Patent: Apr. 2, 2019

(54) FRICTION CLUTCH DEVICE

(71) Applicant: SCHAEFFLER TECHNOLOGIES AG & CO. KG, Bühl (DE)

(72) Inventors: Valentin Khomutovskiy, Bühl (DE); Oswald Friedmann, Lichtenau (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 277 days.

(21) Appl. No.: 15/307,302

(22) PCT Filed: Apr. 22, 2015

(86) PCT No.: PCT/DE2015/200272
§ 371 (c)(1),
(2) Date: Oct. 27, 2016

(87) PCT Pub. No.: WO2015/165459
PCT Pub. Date: Nov. 5, 2015

(65) Prior Publication Data
US 2017/0045097 A1   Feb. 16, 2017

(30) Foreign Application Priority Data
Apr. 28, 2014  (DE) ........................ 10 2014 207 910

(51) Int. Cl.
| | |
|---|---|
| *F16D 23/12* | (2006.01) |
| *F16D 13/40* | (2006.01) |
| *F16D 21/06* | (2006.01) |
| *F16D 121/14* | (2012.01) |

(52) U.S. Cl.
CPC ............ *F16D 23/12* (2013.01); *F16D 13/40* (2013.01); *F16D 2021/0684* (2013.01); *F16D 2121/14* (2013.01)

(58) Field of Classification Search
CPC .. F16D 23/12; F16D 13/40; F16D 2021/0684; F16D 2121/14
See application file for complete search history.

(56) References Cited

U.S. PATENT DOCUMENTS

| | | | | |
|---|---|---|---|---|
| 2,125,433 A | * | 8/1938 | Dunkelow | F16D 21/06 192/21 |
| 2,168,960 A | * | 8/1939 | Morris | F16D 21/06 192/111.1 |

(Continued)

FOREIGN PATENT DOCUMENTS

| | | |
|---|---|---|
| DE | 102009039467 A1 | 3/2011 |
| DE | 102011104412 A1 | 5/2012 |

(Continued)

*Primary Examiner* — Stacey A Fluhart
(74) *Attorney, Agent, or Firm* — Kevin L. Parks

(57) ABSTRACT

A friction clutch for a drive train of a motor vehicle driven by an internal combustion engine. The clutch includes a rotatable shaft, a housing, at least one first clutch plate, at least one second clutch plate that is movable axially to a limited extent relative to the at least one first clutch plate to actuate the clutch. An actuating device that has at least one lever that is pivotally-mounted on one of the clutch plates, and at least one bar one end of which is connected to the lever and an opposite end of which is connected by an articulated connection to a different clutch plate to improve the function of the clutch.

20 Claims, 3 Drawing Sheets

(56) References Cited

U.S. PATENT DOCUMENTS

| | | | | |
|---|---|---|---|---|
| 2,172,077 A * | 9/1939 | Zeidler | ............ | F16D 23/12 192/103 A |
| 2,184,135 A * | 12/1939 | Batten | ............ | F16D 21/06 192/114 R |
| 2,261,432 A * | 11/1941 | Cooke | ............ | F16D 21/06 192/48.8 |
| 2,406,238 A * | 8/1946 | Miller | ............ | F16D 21/06 192/48.91 |
| 2,442,787 A * | 6/1948 | Thelander | ............ | F16D 21/06 192/48.91 |
| 2,613,778 A * | 10/1952 | Carlson | ............ | F16D 21/06 192/109 A |
| 2,773,575 A * | 12/1956 | Binder | ............ | F16D 21/06 192/48.8 |
| 2,854,110 A * | 9/1958 | Senkowski | ............ | F16D 21/06 192/48.8 |
| 3,021,931 A * | 2/1962 | Holz | ............ | F16D 21/06 192/48.7 |
| 3,118,524 A * | 1/1964 | Howard | ............ | F16D 21/06 192/3.27 |
| 3,215,233 A * | 11/1965 | Smith | ............ | F16D 21/06 192/48.7 |
| 3,279,572 A * | 10/1966 | Dearnley | ............ | F16D 21/06 192/111.15 |
| 3,590,968 A * | 7/1971 | Binder | ............ | F16D 21/06 192/48.8 |
| 3,779,353 A * | 12/1973 | Maucher | ............ | F16D 13/385 192/70 |
| 4,026,400 A * | 5/1977 | Rawlings | ............ | F16D 13/38 192/48.91 |
| 4,210,232 A * | 7/1980 | Beccaris | ............ | F16D 13/385 192/48.8 |
| 4,238,019 A * | 12/1980 | Maucher | ............ | F16D 13/385 192/48.8 |
| 5,678,669 A * | 10/1997 | Rainer | ............ | F16D 21/06 192/48.8 |
| 2001/0025760 A1 * | 10/2001 | Dau | ............ | F16D 21/06 192/48.91 |
| 2005/0072648 A1 * | 4/2005 | Peppard | ............ | B62K 11/14 192/99 R |
| 2017/0045097 A1 | 2/2017 | Khomutovskiy et al. | | |

FOREIGN PATENT DOCUMENTS

| | | |
|---|---|---|
| DE | 102012201972 A1 | 8/2013 |
| DE | 102013201262 A1 | 8/2013 |

* cited by examiner

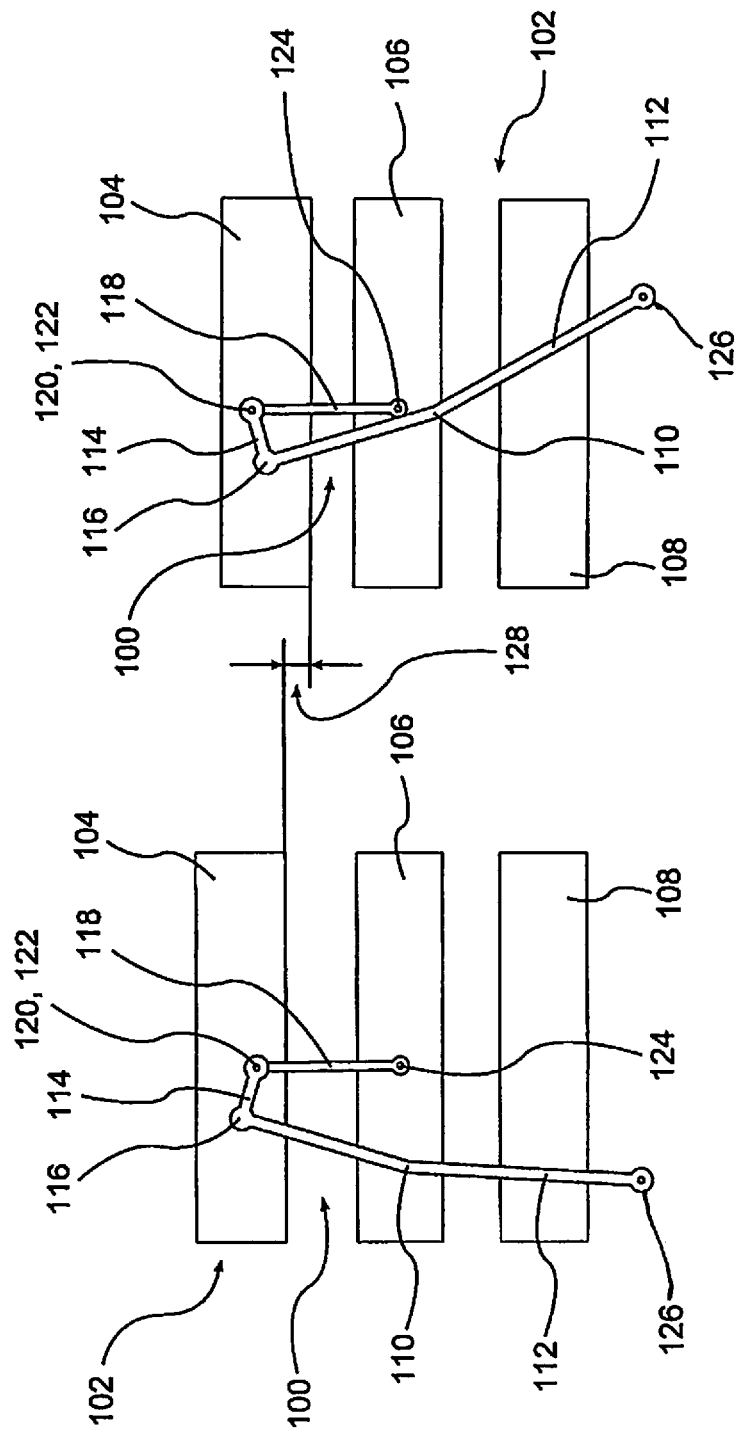

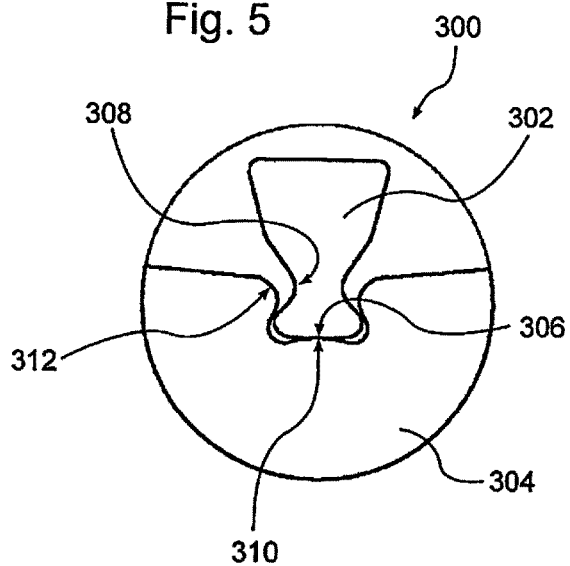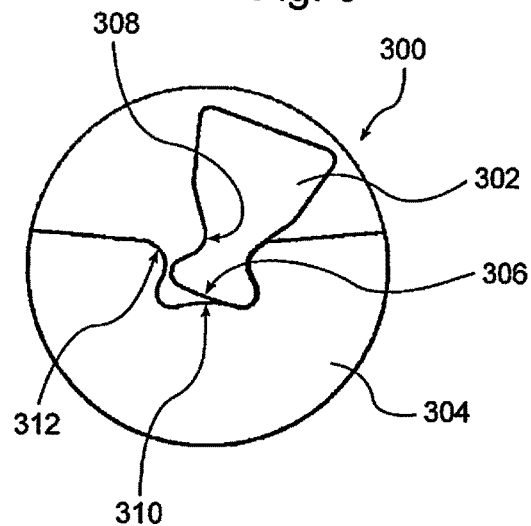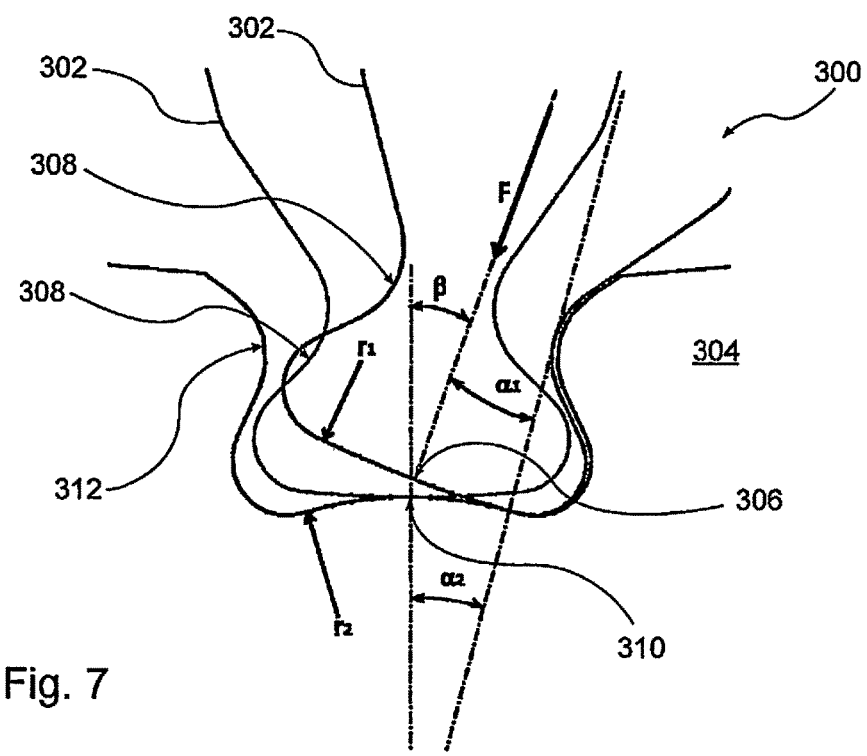

FRICTION CLUTCH DEVICE

CROSS-REFERENCE TO RELATED APPLICATION

This application is the U.S. national phase patent application under 35 U.S.C. § 371 of International Patent Application Serial No. PCT/DE2015/200272, having an international filing date of 22 Apr. 2015, and designating the United States, which claims priority based upon German Patent Application No. DE 10 2014 207 910.1, filed on 28 Apr. 2014, the entire contents of each of which applications are hereby incorporated by reference herein to the same extent as if fully rewritten.

BACKGROUND OF THE INVENTION

Field of the Invention

The present invention relates to a friction clutch device, in particular for a drive train of a motor vehicle driven by an internal combustion engine. The friction clutch includes a rotating shaft, a housing, at least one first clutch plate, at least one second clutch plate that is movable axially to a limited extent relative to the at least one first clutch plate to actuate the friction clutch, and an actuating device.

Description of the Related Art

From DE 10 2011 104 412 A1 a friction clutch is known, in particular for a drive train of a motor vehicle driven by an internal combustion engine. The clutch includes an input part having a pressure plate and at least one contact plate that is movable axially to a limited extent relative to the pressure plate. The clutch also includes at least one output part having at least one clutch plate, the at least one clutch plate being positioned between the pressure plate and the at least one contact plate. Frictional transmission of power and motion between the input part and the output part is enabled depending on movement of the at least one contact plate. A pulley device is provided to move the at least one contact plate.

From DE 10 2013 201 262 A1 a dual clutch is known for coupling a drive shaft of a drive motor of a motor vehicle to a first transmission input shaft and/or to a second transmission input shaft of a motor vehicle transmission. The dual clutch includes a first friction clutch to couple the drive shaft with the first transmission input shaft using a first counter plate, a first contact plate which is movable relative to the first counter plate to press a first clutch plate between the first counter plate and the first contact plate. The dual clutch also includes a first pulley, in particular a compound pulley, to transmit an actuating force to move the first contact plate relative to the first counter plate with the help of a first traction means. The first pulley has first contact plate redirecting means, in particular a cable pulley, that is attached radially on the outside of the first contact plate to redirect the first traction means, and first counter plate redirecting means, in particular a cable pulley, attached radially on the outside of the first counter plate to redirect the first traction means. The dual clutch includes a second friction clutch to couple the drive shaft with the second transmission input shaft using a second counter plate, a second contact plate that is movable relative to the second counter plate to press a second clutch plate between the second counter plate and the second contact plate. The dual clutch also includes a second pulley, in particular a compound pulley, to transmit an actuating force to move the second contact plate relative to the second counter plate with the help of a second traction means. The second pulley has a second contact plate redirecting means, in particular a cable pulley, attached radially on the outside of the second contact plate to redirect the second traction means and second counter plate redirecting means. The second pulley is a cable pulley that is attached radially on the outside of the second counter plate to redirect the second traction means. The first counter plate redirecting means is located opposite the second contact plate redirecting means in the axial direction and/or the second counter plate redirecting means being located opposite the first contact plate redirecting means in the axial direction.

An object of the present invention is to improve a friction clutch of the type identified herein at the beginning either structurally and/or functionally. In particular, a higher transmission ratio is to be made possible when the clutch is actuated. In particular, it is to be made possible to apply engaging and disengaging forces over the entire adjusting distance in the direction of the clutch axis. In particular, construction space is to be better utilized. In particular, an increased tilt angle of a lever element is to be made possible. In particular, slipping motion on a lever element is to be avoided and wear is to be reduced.

SUMMARY OF THE INVENTION

The object is achieved by a friction clutch, in particular for a drive train of a motor vehicle driven by an internal combustion engine. The friction clutch includes a rotating shaft, a housing, at least one first clutch plate, and at least one second clutch plate that is movable axially to a limited extent relative to the at least one first clutch plate to actuate the friction clutch, and an actuating device. The actuating device has at least one lever element that is swivel-mounted on one of the clutch plates, and at least one bar element that is connected on the one hand to the lever element and on the other hand is connected with an articulated connection to a different clutch plate.

The contact plate can be movable between an engaged clutch position and a disengaged clutch position. The friction clutch can have at least one clutch plate that is clampable between the at least one pressure plate and the at least one contact plate to transmit power frictionally.

The drive train can include an internal combustion engine that has an output shaft. The drive train can include a torsional vibration damper. The drive train can include a transmission that has at least one input shaft and can include at least one drivable wheel. The friction clutch can be positionable in the drive train. The friction clutch can be positionable between the internal combustion engine and the transmission, and it can also be positionable between the torsional vibration damper and the transmission.

The friction clutch can have at least one pressure plate, at least one contact plate, and at least one intermediate pressure plate. The at least one first clutch plate can be a pressure plate or an intermediate pressure plate. The at least one second clutch plate can be a contact plate.

The friction clutch can have an input part and at least one output part. The housing can also be referred to as a cover. The input part can be drivable with the help of the output shaft of the internal combustion engine. The at least one input shaft can be drivable with the help of the at least one output part.

The friction clutch can have at least one single plate clutch or at least one multi-plate clutch. The friction clutch can have at least one self-disengaging clutch or at least one self-engaging clutch. The friction clutch can have at least one push clutch or at least one pull clutch. The friction clutch can be operable with the help of a clutch pedal or it can be automatically operable. The friction clutch can have a single clutch with a pressure plate and a contact plate. The friction clutch can also have a dual clutch that has an intermediate pressure plate, a contact plate, and a second contact plate. The intermediate pressure plate can be positioned between the first contact plate and the second contact plate. The friction clutch can be a cable-operated clutch.

Starting from a completely disengaged position, in which there is no transmission of power between the input part and the at least one output part, the friction clutch can enable an increasing mechanical transmission of power, depending on actuation, all the way to a completely engaged position, in which there is essentially complete transmission of power between the input part and the at least one output part. A transmission of power between the input part and the at least one output part can take place non-positively, in particular by frictional engagement. Conversely, starting from a completely engaged position, in which there is complete transmission of power between the input part and the at least one output part, a decrease in mechanical transmission of power can be enabled, depending on actuation, all the way to a completely disengaged position in which there is no transmission of power. A completely engaged position can be a closed actuating position. A completely disengaged position can be an open actuating position.

The friction clutch can serve to enable driving off, as well as changing a transmission ratio. With the help of the friction clutch, the input part on the one hand and a first output part and/or a second output part on the other hand can be connected with one another or separated from one another. Furthermore, during the transition of a gear change, a flow of power from the input part can be transferred from the first output part to the second output part and vice versa.

The at least one first clutch plate and the housing can be firmly connected to one another. The at least one first clutch plate and the housing can be connected to one another non-rotatingly and axially fixed. The at least one second clutch plate and the housing can be connected to one another non-rotatingly. The at least one second clutch plate can be connected to the housing so that it is movable axially to a limited extent. The input part of the friction clutch device can include the housing, the at least one first clutch plate, and the at least one second clutch plate. The at least one output part of the friction clutch device can include the at least one clutch plate.

The actuating device can serve to move the at least one second clutch plate. The actuating device can bear on the one hand against the at least one first clutch plate and/or the housing, and on the other hand against the at least one second clutch plate. The actuating device can serve to change an actuating force and/or an actuating motion and can serve to intensify an actuating force. The actuating device can also serve to convert a rotational actuating motion into a linear actuating motion. The actuating device can have a gear unit that can have a gear ratio, and it can have a mechanical gear unit.

The at least one lever element can be swivel-mounted on a first clutch plate and the at least one bar element can be connected with articulated connections on the one hand to the lever element and on the other hand to a second clutch plate. The at least one lever element can be swivel-mounted on a second clutch plate. The at least one bar element can be connected with articulated connections on the one hand to the lever element and on the other hand to a second clutch plate.

One lever element and one bar element can form an actuating module. The bar element can also be referred to as a link. The actuating device can have at least one actuating module or it can have a plurality of actuating modules. The actuating device can have four to eight actuating modules, in particular six actuating modules.

The clutch plates can each have an outer edge and can each have at least approximately the same outside diameter. The clutch plates can be arranged concentrically to one another. The at least one lever element and the at least one bar element can be located radially on the outer side of the clutch plates, or they can be located at the outer edge of the clutch plates. A plurality of actuating modules of the actuating device can be distributed uniformly in the circumferential direction.

The at least one lever element can swivel around a pivot axis that is perpendicular to the axis of rotation of the friction clutch device. The at least one bar element can be deflectable around joint axes that are perpendicular to the axis of rotation of the friction clutch.

The at least one lever element can be designed as an elbow lever and can have a load arm and a force arm. The force arm can be longer than the load arm. The at least one lever element can also have a fulcrum and it can be positioned with its fulcrum on the at least one pressure plate. The at least one bar element can be connected to the load arm.

The actuating device can have a rotatable ring element that is concentric to the axis of rotation of the friction clutch. The at least one lever element can be connected to the ring element with an articulated connection, and the force arm of the at least one lever element can be connected to the ring element. Rotating the ring element can cause the at least one lever element to pivot.

The friction clutch can have at least one bearing device with an internal part and an external part for swivel-mounting the at least one lever element, and/or to connect the at least one bar element with an articulated connection. The bearing device can also be referred to as a rocker segment. The internal part can be pin-like. The external part can be nut-like. The internal part and the external part can be movable relative to one another, and they can be rollable relative to one another. The internal part can have a rolling section for the external part. The external part can have a rolling section for the internal part. The rolling sections can each have a convex surface and can each have a different rolling radius. The rolling radius of the internal part can be larger than the rolling radius of the external part.

The internal part can have a ball-joint-type cross section and the external part may can have a socket-type cross section. The internal part can be received movably in the external part, and the internal part and the external part can each have a symmetrical cross section. The internal part and the external part can be movable relative to one another between a first end position and a second end position and the first end position and the second end position can limit a tilt angle of the internal part relative to the external part. The internal part and the external part can each have corresponding contours that fit together positively in the end positions. The corresponding contours can each have an S-like shape. Between the internal part and the external part a tilt angle of up to ±25°, in particular of up to ±20°, in particular of up to ±15° can be possible.

The external part can be connected to a clutch plate or to the bar element non-positively, in particular frictionally, and/or positively. The external part can be pressed into the clutch plate or into the bar element. The clutch plate(s) and/or the bar element can have a receptacle for the external part. The internal part can be firmly connected to the lever element.

In summary, and described in other words, the invention yields, among other things, a tilting segment for a lever clutch. A rocker segment can have contact points without sliding friction. A rolling motion can occur. The rocker segment can have two elements that have different rolling radii. One of the elements can be fixed in a lever. The other element can be fixed in a contact plate. The element fixed in the lever can have a larger rolling radius than the element fixed in the contact plate. A tilt angle β of the rocker segment is the sum of angles between a normal in the rolling point and axis of symmetry of the rocker segment (α1 and α2). The above-named angle in a rocker segment pin should not violate a slip condition (tgα1<μ). Thus, the lever can be supported slip-proof on the contact plate over the entire working range (±20°).

A rocker segment nut can have a smaller rolling radius than the rocker segment pin and it can be pressed into a supporting element. In a pairing of contact plate and lever, the contact plate can serve as the supporting element. In a pairing of lever and link, the lever can serve as the supporting element. The rocker segment pin can remain in every position within an external radius of the rocker segment nut, so that a press-fit hole of the supporting element is not touched. The rocker segment nut can surround the rocker segment pin in a contact area in such a way that slipping is avoided during transport. A maximum tilt angle can be chosen so that an angle between a normal in a rolling point and direction of force in the rocker segment pin (also the axis of symmetry) fulfills a slip condition: tgα1<μ.

"Can" designates in particular optional features of the invention. Accordingly, in each case there is one exemplary embodiment of the invention which has the particular feature or particular features.

The friction clutch according to the present invention makes an increased transmission ratio possible when it is activated. Application of engaging and disengaging forces over the entire adjusting distance in the direction of the clutch axis is made possible. Construction space can be better utilized. A greater tilt angle of a lever element is made possible and slipping motion at a lever element is avoided. Additionally, wear is reduced.

Exemplary embodiments of the invention are described in greater detail below in reference to the drawing figures. That description will yield additional features and advantages. Concrete features of the exemplary embodiments can depict general features of the invention. Features of the exemplary embodiments combined with other features can also represent individual features of the invention.

BRIEF DESCRIPTION OF THE DRAWINGS

The drawing figures show the following, schematically and by way of example:

FIG. 1 shows a kinematic model of a lever actuation system of a friction clutch in the disengaged position, FIG. 2 shows a kinematic model of a lever actuation system of a friction clutch in the engaged position, FIG. 5 shows a support of a lever actuation system in its center position, FIG. 6 shows the support of the lever actuation system shown in FIG. 5 when it is in an end position, and FIG. 7 is an enlarged fragmentary view illustrating the geometry of the lever actuation system.

DESCRIPTION OF THE PREFERRED EMBODIMENTS

Figure 3:
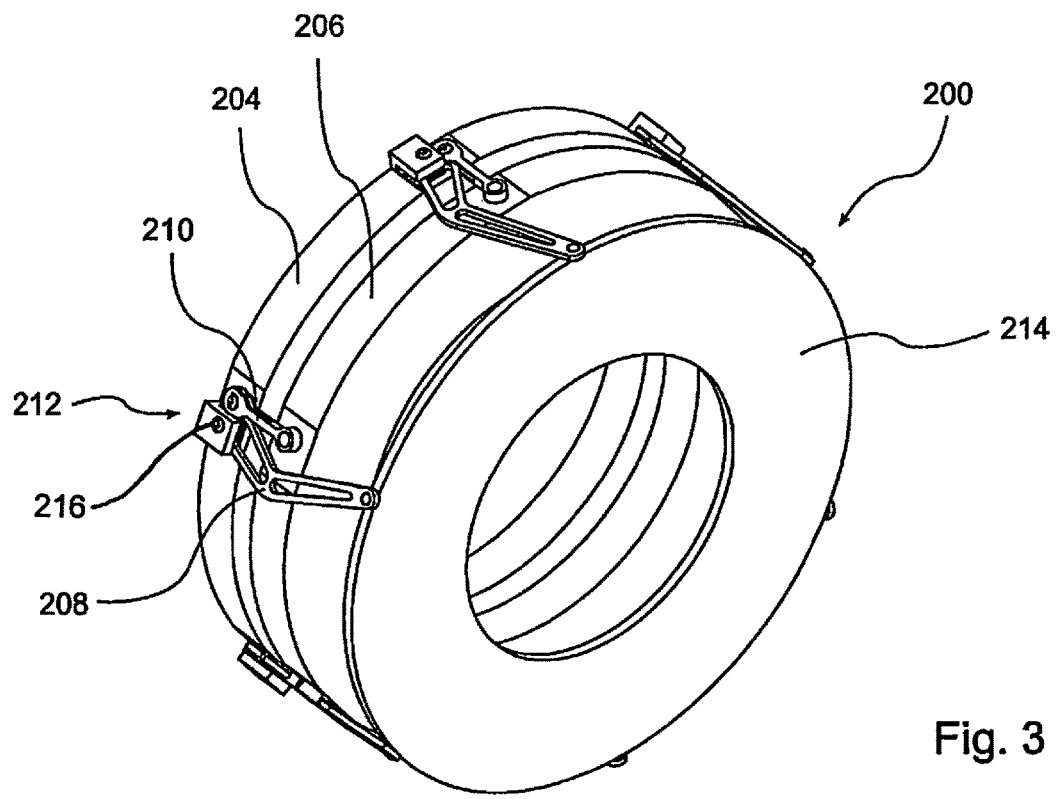
FIG. 3 shows a perspective view of a friction clutch having a lever actuation system.

FIG. 1 shows a kinematic model of a lever actuation system 100 of a friction clutch 102, of which no other structural details are shown, when the clutch is in the disengaged position. FIG. 2 shows the kinematic model of the lever actuation system 100 of the friction clutch 102 when the clutch is in the engaged position.

The friction clutch 102 in the present case is a dual clutch and has a first contact plate 104, an intermediate pressure plate 106, and a second contact plate 108. The intermediate pressure plate 106 is positioned axially between the first contact plate 104 and the second contact plate 108.

The friction clutch 102 is carried within a housing (not shown). The intermediate pressure plate 106 is firmly connected to the housing. The first contact plate 104 and the second contact plate 108 are each connected to the housing so that they are non-rotatable and are each axially movable to a limited extent relative to the intermediate pressure plate 106. The lever actuation system 100 serves to move the first contact plate 104.

The lever actuation system 100 includes a lever element 110. The lever element 110 is designed as an L-shaped lever having a force arm 112, a load arm 114, and a pivot point 116 to which arms 112, 114 are connected. The force arm 112 is longer than the load arm 114. The lever element 110 is swivel-mounted with its pivot point 116 connected to the first contact plate 104. The lever actuation system 100 includes a bar 118. The bar 118 includes an articulated connection at a first end 120 to the free end 122 of the load arm 114, and an articulated connection of a second end 124 to the intermediate pressure plate 106. The force arm 112 has a free end 126 for an actuating force grip.

In the disengaged position shown in FIG. 1, the contact plate 104 and the intermediate pressure plate 106 are spaced far enough apart from one another that no frictional power transmission occurs to/from a clutch plate (not shown) located between the first contact plate 104 and the intermediate pressure plate 106. The lever element 110 can be pivoted around the pivot point 116 by an actuating force grip on the free end 126 of the force arm 112, so that the first contact plate 104 is moved toward the intermediate pressure plate 106 by the bar 118. In the engaged position shown in FIG. 2, the first contact plate 104 is moved toward the intermediate pressure plate 106 in such a way that frictional power transmission can occur to/from a clutch plate located between the first contact plate 104 and the intermediate pressure plate 106. An actuation distance is identified by reference numeral 128 in FIG. 2.

FIG. 3 shows a friction clutch 200 with lever actuation in a perspective view. The friction clutch 200 is a single clutch and includes a contact plate 204 and a pressure plate 206.

The lever actuation system 212 includes a plurality of respective lever elements, such as levers 208, and a plurality of respective bars, such as bars 210. One lever 208 and one bar 210 form an actuating module. The friction clutch 200 includes a plurality of actuating modules 212, six in the present case, which are distributed uniformly in the circumferential direction.

The friction clutch 200 has a rotatable ring 214. The ring 214 is positioned concentrically to the contact plate 204 and to the pressure plate 206. The free ends of the levers 208 are pivotally connected to the ring 214. Rotating the ring 214 causes the levers 208 to pivot relative to their respective pivot points 216. For additional details please see FIG. 1 and FIG. 2 and the associated description.

Figure 4:
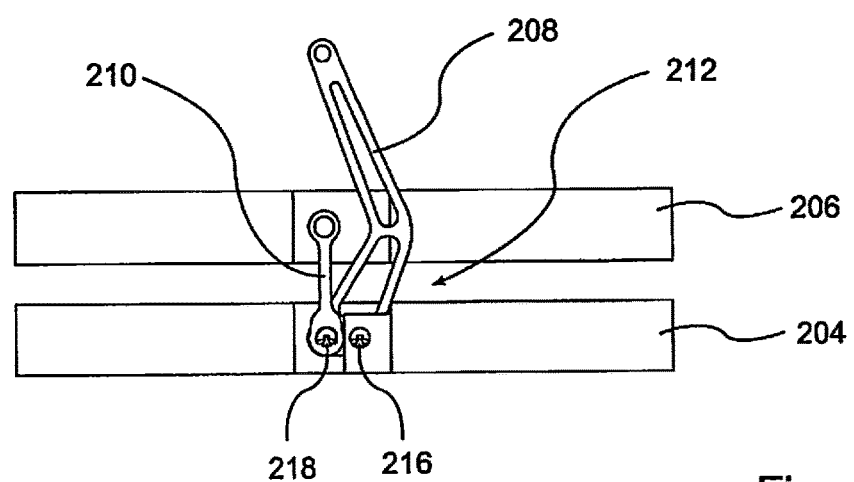
FIG. 4 shows a top detail view of an actuating module of a lever actuation system.

FIG. 4 shows a detail view of an actuating module 212 having a lever 208 and a bar 210. A bearing at pivot point 216 provides rotational support of the lever 208 that is connected to the contact plate 204. A bearing 218 provides rotational support of the bar 210 carried by lever 208.

FIG. 5 shows a bearing 300 of a lever actuation system, like bearings 216, 218 shown in FIG. 4. The lever actuation system is in its center position. FIG. 6 shows the bearing 300 in an end position. FIG. 7 shows in an enlarged view the geometry of the bearing 300 when in its center position and when in an end position.

The bearing 300 has an internal part 302 and an external part 304. The internal part 302 is pin-like, and is firmly connected to a lever of a lever actuation system. The external part 304 is nut-like, and is firmly connected to a clutch plate of a friction clutch or to a bar of a lever actuation system. For example, the external part 304 is pressed into a circular receptacle in the clutch plate or the bar.

The internal part 302 has a rolling section 306 for engagement with the external part 304. At each side of the rolling section 306, the internal part 302 has opposed indentations 308. The external part 304 has a rolling section 310 for receiving the internal part 302. At each side of the rolling section 310, the external part 304 has opposed appendages 312. As shown in FIG. 7, rolling section 306 of the internal part 302 and the rolling section 310 of the external part 304 each have a convex surface. The rolling section 306 of the internal part 302 has a radius r1, and the rolling section 310 of the external part 304 has a radius r2 that is smaller than radius r1. The internal part 302 and the external part 304 are movable relative to one another between two end positions through a tilt angle β. Because the slip condition tgα1<μ is satisfied, the internal part 302 and the external part 304 roll against one another at their rolling sections 306, 310 without slipping. A force along a perpendicular is identified as F.

In the end positions, one indentation 308 of the internal part 302 and one appendage 312 of the external part 304 fit together positively. That limits movability at the end positions. For other details please see in particular FIG. 4 and the associated description.

What is claimed is:

1. A friction clutch for a drive train of a motor vehicle driven by an internal combustion engine, said friction clutch comprising:
a shaft rotatable about a clutch axis of rotation, a housing, a first clutch plate, a second clutch plate that is movable axially relative to the first clutch plate to actuate the friction clutch, and a clutch actuating device;
wherein the clutch actuating device includes a lever that is pivotally carried on the first clutch plate, and a bar that is connected on one end to the lever and on an opposite end is connected with a first articulated connection to the second clutch plate; and,
wherein the lever and the bar are located radially at an outer edge of the first clutch plate and the second clutch plate.

2. A friction clutch according to claim 1, wherein the lever is pivotable about a pivot axis that is perpendicular to the clutch axis of rotation of the friction clutch and the bar is pivotable about a pair of joint axes that are perpendicular to the clutch axis of rotation of the friction clutch.

3. A friction clutch according to claim 1, wherein the lever includes a load arm and a force arm and the bar is connected to the load arm.

4. A friction clutch according to claim 1, wherein the clutch actuating device includes a rotatable ring that is concentric to the clutch axis of rotation of the friction clutch, and the lever is connected to the rotatable ring with a second articulated connection.

5. A friction clutch according to claim 1, wherein the friction clutch includes a bearing having an internal part and an external part, the internal part and the external part being movable relative to one another.

6. A friction clutch according to claim 5, wherein the internal part includes a recessed rolling section for pivotally receiving the external part, and the external part includes a rolling section for engagement with the rolling section of the internal part, and the rolling section of the internal part and the rolling section of the external part each have respective different rolling radii.

7. A friction clutch according to claim 5 wherein the internal part has a ball-joint-type cross section, and the external part has a socket-type cross section for pivotally receiving the ball-joint-type cross section of the internal part.

8. A friction clutch according to claim 5, wherein the internal part is tiltable relative to the external part through a tilt angle ($\beta$) of up to 25°.

9. A friction clutch according to claim 5, wherein the external part is firmly connected to the first clutch plate, the second clutch plate or the bar.

10. A friction clutch according to claim 5, wherein the internal part is tiltable relative to the external part through a tilt angle ($\beta$) of up to 15°.

11. A friction clutch according to claim 5, wherein the internal part is tiltable relative to the external part through a tilt angle ($\beta$) of up to 20°.

12. A friction clutch according to claim 5, wherein the external part is frictionally connected to the first clutch plate, the second clutch plate or the bar.

13. A friction clutch comprising:
a clutch axis of rotation;
a first clutch plate;
a second clutch plate, axially movable relative to the first clutch plate to engage the friction clutch; and,
a clutch actuating device comprising:
a rotatable ring concentric with the clutch axis of rotation,
a lever, pivotally connected to the first clutch plate and connected to the rotatable ring by an articulated connection; and,
a bar including a first end connected to the lever and a second end connected to the second clutch plate.

14. The friction clutch of claim 13 wherein the lever is pivotable about a first axis perpendicular to the clutch axis of rotation.

15. The friction clutch of claim 13 wherein the lever comprises a load arm and a force arm, and the first end of the bar is connected to the load arm.

16. The friction clutch of claim 13 wherein the lever comprises a load arm and a force arm, and the rotatable ring is connected to the force arm.

17. The friction clutch of claim 13 wherein:
the articulated connection is formed by a bearing; and,
the bearing has an internal part and an external part, movable relative to the internal part.

18. The friction clutch of claim 17 wherein:
the internal part comprises a first recessed rolling section with a first convex surface having a first radius;

the external part comprises a second rolling section with a second convex surface having a second radius, smaller than the first radius; and, the first convex surface contacts the second convex surface.

19. A friction clutch comprising:
a clutch axis of rotation;
a first clutch plate;
a second clutch plate, axially movable relative to the first clutch plate to engage the friction clutch; and,
a clutch actuating device comprising:
   a lever, pivotally connected to the first clutch plate; and,
   a bar including a first end connected to the lever and a second end connected to the second clutch plate; and,
   an articulated connection, wherein:
     the articulated connection is formed by a bearing;
     the bearing has an internal part and an external part, movable relative to the internal part;
     the internal part includes a first recessed rolling section for pivotally receiving the external part;
     the external part includes a second rolling section for engagement with the first recessed rolling section; and,
     the first recessed rolling section and the second rolling section have respective different rolling radii.

20. The friction clutch of claim 19 wherein:
the first recessed rolling section comprises a first convex surface having a first radius;
the second rolling section comprises a second convex surface having a second radius, smaller than the first radius; and,
the first convex surface contacts the second convex surface.

* * * * *